Figure 1:
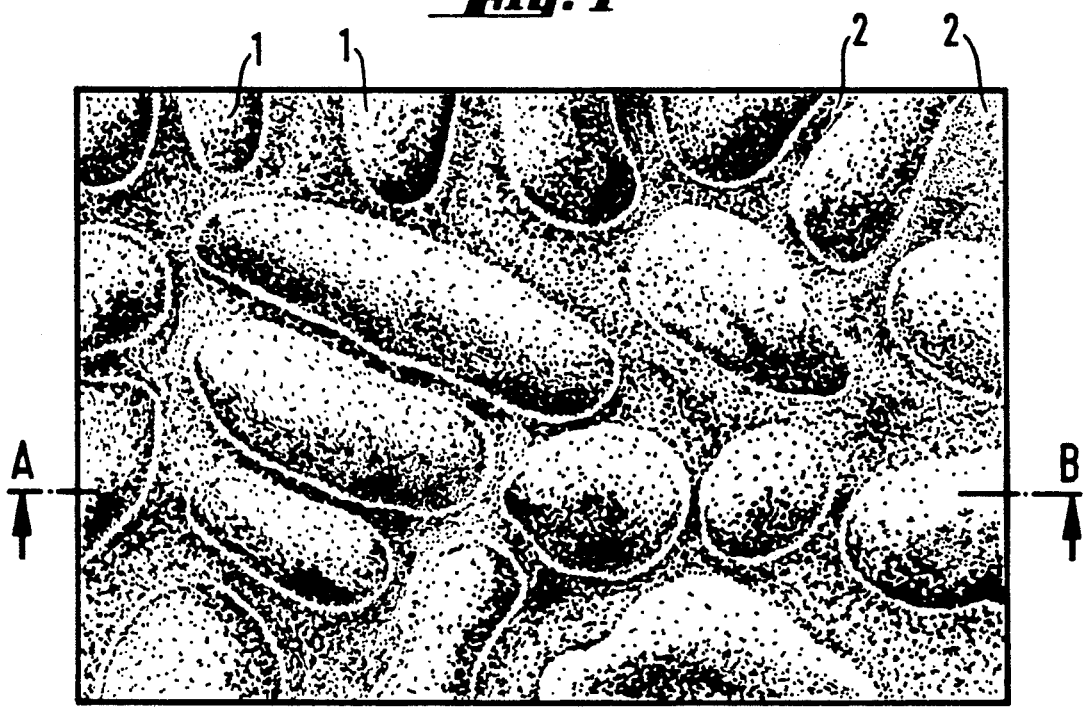

United States Patent [19]
Gübitz et al.

[11] Patent Number: 5,165,982
[45] Date of Patent: Nov. 24, 1992

[54] SHAPED PLASTIC ARTICLE HAVING A GRAINED SURFACE OF IMPROVED SCRATCH RESISTANCE

[75] Inventors: Franz Gübitz, Kelkheim; Walter Grolik, Darmstadt; Eckhard Kuhnhenne, Wiesbaden; Peter Jaksch, Rüsselsheim, all of Fed. Rep. of Germany

[73] Assignee: Hoechst Aktiengesellschaft, Fed. Rep. of Germany

[21] Appl. No.: 583,792

[22] Filed: Sep. 17, 1990

[30] Foreign Application Priority Data

Sep. 20, 1989 [DE] Fed. Rep. of Germany ....... 3931299

[51] Int. Cl.$^5$ .......................... B32B 3/00; D06N 7/04
[52] U.S. Cl. .................................... 428/141; 428/120; 428/156; 428/409; 428/908.8

[58] Field of Search ............... 428/156, 105, 141, 167, 428/409, 120, 195, 332, 338, 339, 908.8

[56] References Cited

U.S. PATENT DOCUMENTS

| | | | |
|---|---|---|---|
| 3,357,772 | 12/1967 | Rowland | 428/156 |
| 4,352,847 | 10/1982 | Okiyama | 428/409 |
| 4,367,511 | 1/1983 | Crass et al. | 428/156 |
| 4,413,109 | 11/1983 | Haas | 428/156 |
| 4,546,029 | 10/1985 | Cancio et al. | 428/156 |

*Primary Examiner*—Donald J. Loney
*Attorney, Agent, or Firm*—Connolly and Hutz

[57] ABSTRACT

The scratch resistance of plastic surfaces can be improved by providing the surfaces with a novel grain structure.

1 Claim, 1 Drawing Sheet

SHAPED PLASTIC ARTICLE HAVING A GRAINED SURFACE OF IMPROVED SCRATCH RESISTANCE

The invention relates to shaped plastic articles whose surfaces have improved scratch resistance properties.

The surfaces of shaped plastic articles are frequently grained for visual and practical reasons to improve the scratch resistance. Such articles can be found on the inside and outside of automotive vehicles, for example as instrument panels or as bumpers.

In the latest types of motor vehicles being developed, the trend for the interior trim is increasingly away from amorphous plastics and toward partly crystalline reinforced plastics. However, these new materials have more sensitive surfaces, which, even with a grain, may become marred and scratched.

It is an object of the present invention to provide a plastic surface of improved scratch resistance.

We have found that this object is achieved with a certain form of grain.

The present invention accordingly provides a shaped plastic article having a grained surface of improved scratch resistance, wherein the surface grain is such that
 a) the grain hills have a rounded surface on all sides,
 b) the grain hills are completely separated from one another by grain valleys,
 c) there are from 13 to 25 grain hills over a distance of 10 mm, and
 d) the average roughness depth of the grain is from 42 to 58 μm.

The present invention also provides a process for improving the scratch resistance of the surface of shaped plastic articles.

The grain to be employed according to the present invention comprises a multiplicity of small grain hills. The basic outline of these grain hills is always rounded, for example circular, elliptical, kidney-shaped, club-shaped or the like. Also, the surface of the grain hills is rounded on all sides. The hill side gradient is small. The grain hills are relatively flat and of substantially uniform height.

The grain hills ar completely separated from one another by grain valleys. The floor of these grain valleys is substantially planar, creating the impression that the grain hills form elevations on the planar surface.

Over a distance of 10 mm there are from 10 to 25, preferably from 15 to 21, grain hills in an irregular arrangement.

The average roughness depth of the grain is from 42 to 58, preferably from 45.5 to 55.6, μm. The average roughness depth is the average of the individual roughness depths measured individually at five successive points. The measurement of the roughness depth is a standardized method (VDI/VDE Guidelines 2602).

The grain according to the present invention can be applied to all surfaces of articles which for esthetic or practical reasons are to have a matt appearance. More particularly, the grain is applied to surfaces of shaped plastic articles, for example to articles made of polypropylene, polyethylene, propylene-ethylene copolymers, polyvinyl chloride, polyacetate, polystyrene, polyamides, polyesters and other thermoplastics.

More particularly still, the grain according to the present invention is employed in the case of articles made of reinforced polyolefins, for example reinforced polypropylene, for motor vehicles. Such articles have surfaces of excellent scratch resistance. It is left virtually unmarked by fingernails or car keys and the like. The grain thus helps to preserve the attractive appearance of new parts for longer.

The grain is conveniently applied to the surface of a shaped article in the course of the manufacture of the shaped article by using blow or compression molds which have a negative grain pattern in the proposed areas.

The Figures show the grain according to the present invention in plan view and in section.

FIG. 1 shows a plan view of the grain. It is easy to see the completely rounded shape of the grain hills (1) and the flat grain valleys (2).

Figure 2:

This is even clearer from FIG. 2, which represents a section AB perpendicular to the surface of the article. Irregularly sized grain hills (1) of rounded shape alternate with flat grain valleys (2).

The invention is further illustrated by the following Example:

EXAMPLE

Sheets of talc-reinforced polypropylene were provided on one side with a grain according to the prior art. Further sheets of the same material received a grain according to FIGS. 1 and 2. Both patterns were subjected to scratch tests in a scratching apparatus by drawing a carriage over the grained surface at a constant speed. The carriage had interchangeable scratching tools on its underside and could be loaded with various weights. The tests were carried out using an increasing load. The results are summarized in the table.

|  | Grain according to prior art | Grain according to the present invention |
| --- | --- | --- |
| average roughness depth | 66.7 μm | 50.4 μm |
| maximum roughness depth | 77.6 μm | 61.8 μm |
| pointed scratching tool load 500 g | pronounced flattening or crushing of grain structure | slight flattening or crushing of grain structure |
| round scratching tool (r = 0.5 mm) load 600 g | smoothing and polishing of grain hill surface | hardly noticeable smoothing and polishing of grain hill surface |

We claim:
1. A shaped plastic article having a grained surface of improved scratch resistance, wherein the surface includes grain hills,
 a) the grain hills have a rounded surface on all sides,
 b) the grain hills are completely separated from one another by grain valleys,
 c) there are from 13 to 25 grain hills over a distance of 10 mm,
 d) the average roughness depth of the grained surface is from 42 to 58 μm,
 e) the grain hills are relatively flat and of substantially uniform height,
 f) the grain hills are in an irregular arrangement, and
 g) the grain hills form elevations on a planar surface.

* * * * *